Figure 1:
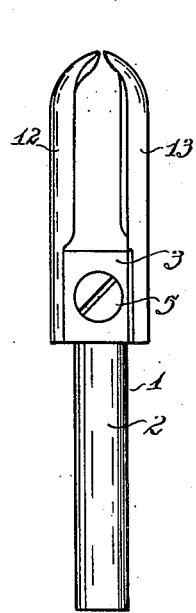

May 28, 1940.  R. G. GILLE  2,202,251

WOOD CARVING TOOL

Filed April 17, 1937

INVENTOR.
Raymond G. Gille
BY
Thomas D. Lane
ATTORNEY.

Patented May 28, 1940

2,202,251

UNITED STATES PATENT OFFICE 2,202,251

WOOD CARVING TOOL

Raymond G. Gille, St. Paul, Minn.

Application April 17, 1937, Serial No. 137,513

3 Claims. (Cl. 144—219)

The present invention relates to a wood carving tool of the type wherein a blade, or a pair of blades, are mounted on a spindle adapted to be mounted on a rotating head of a wood carving machine.

Such wood carving tools have a high normal working speed of about ten thousand R. P. M. and it is therefore essential that the mounting be adequately strong to withstand the tremendous stresses to which the tool is subjected during its operation at such speed.

Various means of mounting the blades on carving tools of this general type have heretofore been employed, and while some of these blade mountings have been quite satisfactory in that they were sufficiently strong to withstand the operating stresses, nevertheless they were open to certain objections. One of these objections was that the blades for the tool were not capable of longitudinal adjustment to bring the ends of the two blades in lateral alignment and it was therefore necessary, when a pair of blades were found to be of slightly unequal length, to correct the adjustment by means of grinding. Also the tools were not adapted to have a flush exterior contour, and it was necessary to offset the blades outwardly from the axis of the tool to permit operation of the tool at a depth greater than the length of the blades. Furthermore the former tools have been relatively expensive to manufacture and require a specially formed and ground blade to provide the clearance necessary for operation of these tools.

An object of the present invention is to make an improved and simplified wood carving tool.

Another object is to make an improved wood carving tool having blades of circular curvature with the center of curvature of each blade laterally offset from the axis of rotation of a holder in which the blades are mounted.

Another object is to mount a blade of a wood carving tool in a blade holder having an undercut recess, the sides of which are adapted to be drawn together under pressure to retain the blade in adjusted position therein.

In order to attain these objects there is provided, in accordance with one feature of the invention, a carving tool having a cylindrical shank portion adapted to be mounted in a collet or tool holder of a carving machine head. The shank portion has an integrally connected head portion divided longitudinally and provided with diagonally disposed undercut recesses, one on each of two opposite sides thereof to receive a pair of longitudinally curved blades.

Clamping means are provided to draw the sides of the head portion together into clamping engagement with the edges of the blades. The positioning of the blades in the diagonally disposed recesses offsets the center of curvature of the blades from the center of rotation of the tool so that one edge of the blades is closer, radially, to the center of rotation of the tool than the other edge of said blade. By sharpening the edge more remote from the center of rotation and rotating the tool with this edge leading, the necessary clearance for the blade is thus provided without the necessity of grinding the blade of the tool on a different arc from the blade root.

Figure 2:
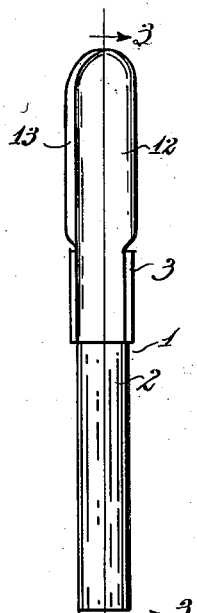
Figure 3:
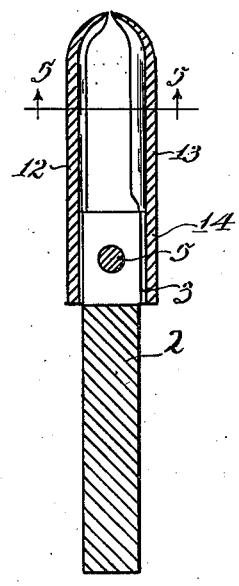
Figure 4:
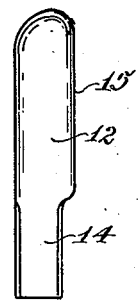
Figure 5:
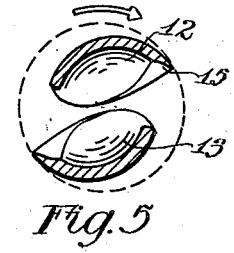
Figure 6:
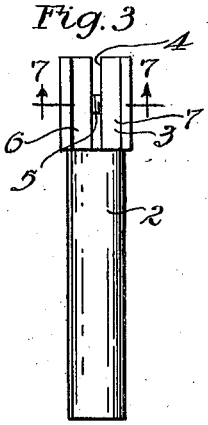
Figure 8:
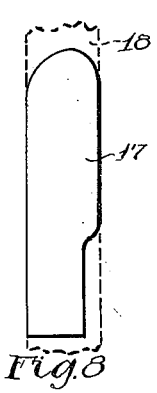
Figure 7:
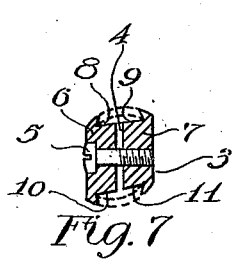

These and other features of the invention will be more fully set forth in the following description and the accompanying drawing, wherein, Figure 1 is a view in side elevation of a wood carving tool embodying the present invention, Figure 2 is a view in side elevation of the tool illustrated in Figure 1 taken at an angle of ninety degrees from the position illustrated in Figure 1, Figure 3 is a sectional view on the line 3—3 of Figure 2, Figure 4 is a view in side elevation showing the exterior of one of the blades used in the tool illustrated in Figures 1 to 3 inclusive, Figure 5 is an enlarged sectional view on the line 5—5 of Figure 3, the circle described by the cutting edges of the blades being indicated in dotted lines, Figure 6 is a view in side elevation of the blade holder in the position illustrated in Figure 2, Figure 7 is a sectional view on the line 7—7 of Figure 6, and, Figure 8 is a plan view of a blade blank.

Referring to the drawing in detail, a blade holder 1 comprises a cylindrical portion 2 and head portion 3. The head portion 3 has a longitudinal slot 4 therein to divide the head portion into two similar halves. A screw 5 has a freely rotatable fit in an opening transversely of one half 6 of the divided head portion said screw having threaded connection with a threaded opening in the other half 7 of the divided head. A pair of undercut recesses 8 and 9 are provided, one in each half of the divided head portion 6 and 7. The bases of these recesses lie at an acute angle with respect to the slot 4 dividing the head portion 3. A similar pair of recesses 10 and 11 are cut in the opposite sides of each of the head portions 6 and 7. A pair of similar blades 12 and 13 may be formed of sheet tool steel, the blades being curved on a circular arc and having the outer ends thereof curved inwardly toward each other in a conventional manner.

The lower or root portion 14 of each of the blades, is formed to a width (see Figure 4) to be insertable in one of the pair of recesses 8 and 9 or 10 and 11. It will be noted that the cutting edge 15 projects outwardly in the direction of rotation beyond the leading edge of the root portion 14, so that when a pair of blades are mounted in a blade holder as shown in Figure 7 the cutting edges of the blades will project outward beyond the radius of rotation of the head portion 3, thereby providing adequate clearance for the head portion when the tool enters the work to a depth greater than the length of the blades. It will be noted in Figure 5 that due to the mounting of the blades with their center of curvature offset from the center of rotation of the shank portion 2, that it is unnecessary to grind any clearance on the exterior face of the blades, since this disposition of the blades provides adequate clearance in itself. On inserting the blades in the holder, and before the screw 5 is tightened to clamp the blades rigidly in position, either of the blades may be moved longitudinally of the holder to bring the ends of the blades in lateral alignment, whereupon the screw 5 may be drawn tight to firmly clamp the blades in position.

A blank 17, (see Figure 3) may be stamped from a ribbon 18 of tool steel, indicated in dotted lines so that the blades may be produced at high speed and with very simple machinery.

The above description has all been directed to a tool adapted for righthand rotation. It is customary in carving tools of this type to mount the tools in pairs, one rotating to the right and the other to the left. To make a lefthand cutting tool blade, the blade blank 17 illustrated in Figure 8, instead of being curved convexly from the position illustrated would be curved concavely which would make an oppositely facing blade. Likewise tool holders for these lefthand blades would have the bottoms of the blade receiving recesses on a reverse obliquity from that of a righthand tool holder, so that Figure 7 would constitute a sectional view of the blade holder looking toward the shank instead of, as in the present instance, away from the shank.

The device is very simple to make and readily lends itself to quantity production. It provides a tool having a smooth exterior and is capable of rapid and accurate adjustment.

I claim:

1. A wood carving tool adapted to be rotatably mounted on the spindle of a wood carving machine, comprising a shank portion, a divided head portion having a pair of undercut recesses in opposite sides thereof, the head portion being divided on a line substantially bisecting said recesses and a blade having a root portion insertable in said recesses, said blade having a substantially uniform transverse curvature, said recesses being positioned obliquely to a radius from the center of rotation of said tool through a mid-point of said recesses, to laterally offset the center of curvature of said blade from the center of rotation of said tool to provide a cutting clearance for said blade.

2. A wood carving tool adapted to be rotatably mounted on the spindle of a wood carving machine comprising a shank portion, a head portion, blade mounting means carried by said head and positioned at an acute angle to a radius of the axis of rotation of said tool and a curved blade having a root portion insertable in said mounting means, said blade having a substantially uniform transverse curvature through the root and a cutting portion of said blade, the center of curvature of said blade being laterally offset from the center of rotation of said tool to provide a cutting clearance for said blade.

3. A wood carving tool adapted to be rotatably mounted on the spindle of a wood carving machine, said tool having a shank, a divided head portion, said head portion having a tool gripping recess in each side thereof extending across the division of said head, each recess having spaced, tool-gripping edges, said recesses having their tool-gripping edges on the opposite sides of each half of the head located at different distances from the rotative axis of said tool, and a blade having a curved root portion insertable in said recesses and having a blade substantially concentric with said root portion gripped eccentrically to the plane of rotation of said head portion.

RAYMOND G. GILLE.